United States Patent
Kimura et al.

(10) Patent No.: US 7,762,425 B2
(45) Date of Patent: Jul. 27, 2010

(54) VACUUM CONTAINER APPARATUS USED FOR MANUFACTURING SEMICONDUCTOR DEVICES AND LID APPARATUS FOR SAME

(75) Inventors: Toru Kimura, Kanagawa (JP); Hiroshi Narushima, Yamanashi (JP); Tsutomu Hiroki, Yamanashi (JP)

(73) Assignees: Tokyo Electron Limited, Tokyo (JP); NHK Spring Co., Ltd., Yokohama-shi (JP)

( * ) Notice: Subject to any disclaimer, the term of this patent is extended or adjusted under 35 U.S.C. 154(b) by 1131 days.

(21) Appl. No.: 10/539,571

(22) PCT Filed: Dec. 16, 2003

(86) PCT No.: PCT/JP03/16091

§ 371 (c)(1),
(2), (4) Date: Jun. 17, 2005

(87) PCT Pub. No.: WO2004/055419

PCT Pub. Date: Jul. 1, 2004

(65) Prior Publication Data

US 2006/0021992 A1    Feb. 2, 2006

(30) Foreign Application Priority Data

Dec. 17, 2002    (JP) .............................. 2002-364581

(51) Int. Cl.
*B65D 43/14* (2006.01)
*E05D 7/06* (2006.01)

(52) U.S. Cl. ....................... 220/849; 220/817; 220/830; 16/240; 16/289

(58) Field of Classification Search ................. 220/817, 220/830, 833, 834, 845, 848, 849, 818, 231, 220/827, 828; 16/240, 289, 239, 235
See application file for complete search history.

(56) References Cited

U.S. PATENT DOCUMENTS

| 2,941,236 A | * | 6/1960 | Monroe et al. ................. 16/368 |
| 3,758,919 A | * | 9/1973 | Dilworth, Jr. ................. 16/240 |
| 4,404,881 A | * | 9/1983 | Hanifl .......................... 83/167 |
| 5,120,087 A | * | 6/1992 | Pastva ......................... 292/22 |
| 5,731,678 A | * | 3/1998 | Zila et al. ............... 318/568.11 |
| 6,050,446 A | | 4/2000 | Lei et al. |

FOREIGN PATENT DOCUMENTS

| CN | 2425134 Y | 3/2001 |
| FR | 1324277 | 7/1963 |
| JP | 59568/1984 | 4/1984 |
| JP | 69757/1991 | 7/1991 |
| JP | 2000-2281 | 1/2000 |

* cited by examiner

*Primary Examiner*—Robin Hylton
(74) *Attorney, Agent, or Firm*—Oblon, Spivak, McClelland, Maier & Neustadt, L.L.P.

(57) ABSTRACT

A lid apparatus for opening/closing an opening of a main body includes a lid with working and back faces. An arm attaches the lid to the main body to be operable for opening/closing. The arm includes a first axis pivotally supporting the arm on the main body around the opening, and a second axis swingably supporting the back face of the lid on the arm. The second axis is located between the gravity center of the lid and the first axis. A regulatory member intervenes between the arm and the back face of the lid to set the working face of the lid in parallel with the opening.

10 Claims, 6 Drawing Sheets

VACUUM CONTAINER APPARATUS USED FOR MANUFACTURING SEMICONDUCTOR DEVICES AND LID APPARATUS FOR SAME

CROSS-REFERENCE TO RELATED APPLICATION

This is a U.S. national phase application under 35 U.S.C. §371 of International application PCT/JP03/16091 (not published in English), filed Dec. 16, 2003.

TECHNICAL FIELD

The present invention relates to a lid apparatus and vacuum container apparatus, and particularly to a technique utilized in a semiconductor process for manufacturing semiconductor devices. The term "semiconductor process" used herein includes various kinds of processes which are performed to manufacture a semiconductor device or a structure having wiring layers, electrodes, and the like to be connected to a semiconductor device, on a target substrate, such as a semiconductor wafer or a glass substrate used for an LCD (Liquid Crystal Display) or FPD (Flat Panel Display), by forming semiconductor layers, insulating layers, and conductive layers in predetermined patterns on the target substrate.

BACKGROUND ART

In manufacturing semiconductor devices, a target substrate, such as a semiconductor wafer, is subjected to various processes, such as a film-formation process and etching process. In order to perform processes of this kind, vacuum processing systems are employed. A vacuum processing system includes a plurality of vacuum containers that define vacuum chambers. These vacuum chambers are exemplified by a process chamber for accommodating a target substrate and performing a predetermined process thereon; a load-lock chamber for adjusting pressure between atmospheric pressure and vacuum; and a transfer chamber having a transfer device disposed therein for the target substrate. A vacuum container has an opening for performing maintenance of the interior. The opening is airtightly closed by a lid, which is operable for opening/closing.

A sealing member, such as an O-ring, is interposed between the lid and vacuum container, to ensure that the container is airtight when the lid is closed. Accordingly, it is important to prevent the sealing member from being abraded or twisted, when the lid is being operated for opening/closing. U.S. Pat. No. 6,050,446 discloses a lid apparatus arranged to prevent a sealing member from being abraded or twisted.

This lid apparatus includes a lid for opening/closing an opening of a vacuum container. The lid is pivotally supported by an axial support disposed on a side of the vacuum container. The lid is provided with a support shaft extending through its center of gravity. The opposite ends of the support shaft are rotatably supported by drive cylinders disposed on sides of the container main body. The lid is operated for opening/closing while rotating about the axial support in accordance with extension and contraction of the drive cylinders. The axial support of the lid is oblong, so that the lid can be set in parallel with the opening when the lid is closed. This device however has a problem in that the drive portion takes up much space, and thus the device becomes large.

DISCLOSURE OF INVENTION

An object of the present invention is to provide a lid apparatus and vacuum container apparatus that can be compact.

According to a first aspect of the present invention, there is provided a lid apparatus for opening/closing an opening formed in a main body, the apparatus comprising:

a lid having a working face configured to open/close the opening, and a back face reverse to the working face;

an arm attaching the lid to the main body, for the lid to be operable for opening/closing, the arm including a first axis to pivotally support the arm relative to the main body around the opening, and a second axis to swingably support the lid relative to the arm through the back face, and the second axis being disposed between a center of gravity of the lid and the first axis; and a regulatory member configured to intervene between the arm and the back face of the lid, at a regulatory position between the first and second axes, so as to regulate a distance between the arm and the back face of the lid at the regulatory position, such that the working face of the lid is set in parallel with the opening.

According to a second aspect of the present invention, there is provided a vacuum container apparatus comprising:

an airtight container main body having an opening and a seat portion surrounding the opening;

a vacuum exhaust section configured to exhaust an interior of the main body;

a sealing member disposed on the seat portion around the opening;

a lid configured to sit on the seat portion and airtightly close the main body through the sealing member, the lid having a working face configured to open/close the opening, and a back face reverse to the working face;

an arm attaching the lid to the main body, for the lid to be operable for opening/closing, the arm including a first axis to pivotally support the arm relative to the main body around the opening, and a second axis to swingably support the lid relative to the arm through the back face, and the second axis being disposed between a center of gravity of the lid and the first axis; and a regulatory member configured to intervene between the arm and the back face of the lid, at a regulatory position between the first and second axes, so as to regulate a distance between the arm and the back face of the lid at the regulatory position, such that the working face of the lid is set in parallel with the opening.

BEST MODE FOR CARRYING OUT THE INVENTION

An embodiment of the present invention will now be described with reference to the accompanying drawings. In the following description, the constituent elements having substantially the same function and arrangement are denoted by the same reference numerals, and a repetitive description will be made only when necessary.

Figure 1:
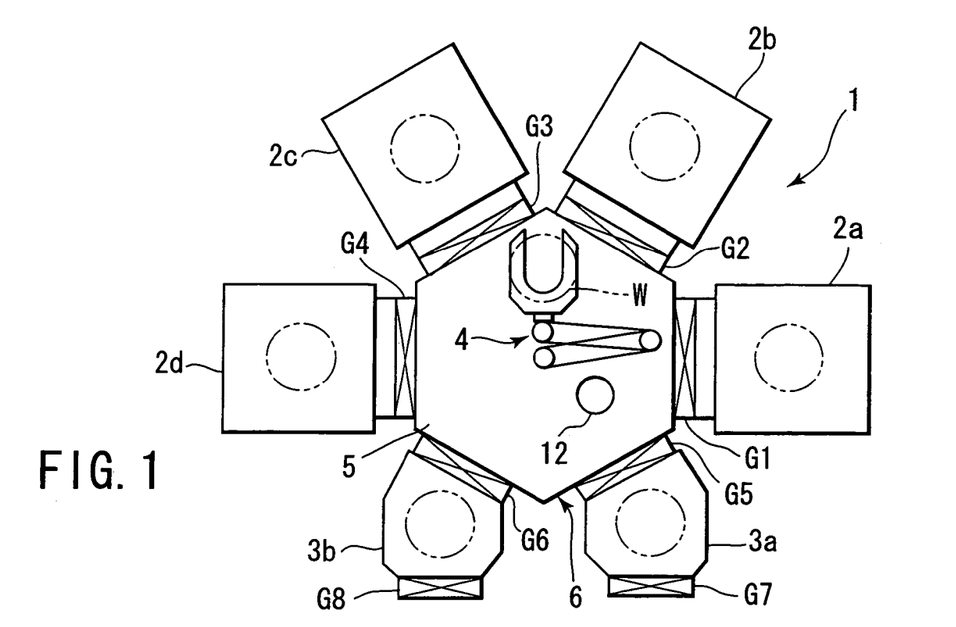
FIG. 1 is a plan view showing a vacuum processing system for a semiconductor process, to which a lid apparatus and vacuum container apparatus according to an embodiment of the present invention are applied.

FIG. 1 is a plan view showing a vacuum processing system for a semiconductor process, to which a lid apparatus and vacuum container apparatus according to an embodiment of the present invention are applied. As shown in FIG. 1, the vacuum processing system 1 is of a so-called multi-chamber type, in which a plurality of, e.g., four, process chambers 2a, 2b, 2c, and 2d are disposed around and connected to a common transfer chamber 5. A plurality of, e.g., two load-lock chambers 3a and 3b are also connected to the transfer chamber 5. Each of the process chambers 2a, 2b, 2c, and 2d is arranged to accommodate a target substrate, such as a semiconductor wafer W, one at a time, and to perform a predetermined process, such as a film-formation process or etching process, thereon. Each of the load-lock chambers 3a and 3b is arranged to perform pressure adjustment, which is necessary for transferring a wafer W between the transfer chamber 5 and the outside with atmospheric pressure. The transfer chamber 5 is provided with a transfer arm mechanism 4 disposed therein, for transferring a wafer W among the process chambers 2a, 2b, 2c, and 2d, and load-lock chambers 3a and 3b.

The transfer chamber 5 of this example is essentially hexagonal in the plan view. The process chambers 2a, 2b, 2c, and 2d are connected to four sides of the transfer chamber 5 through gate valves G1, G2, G3, and G4, respectively. The load-lock chambers 3a and 3b for in/out-transfer are connected to the other two sides of the transfer chamber 5 through gate valves G5 and G6, respectively. The load-lock chambers 3a and 3b respectively have wafer load ports facing the outside, on which gate valves G7 and G8 are disposed to open/close the ports.

Figure 2:
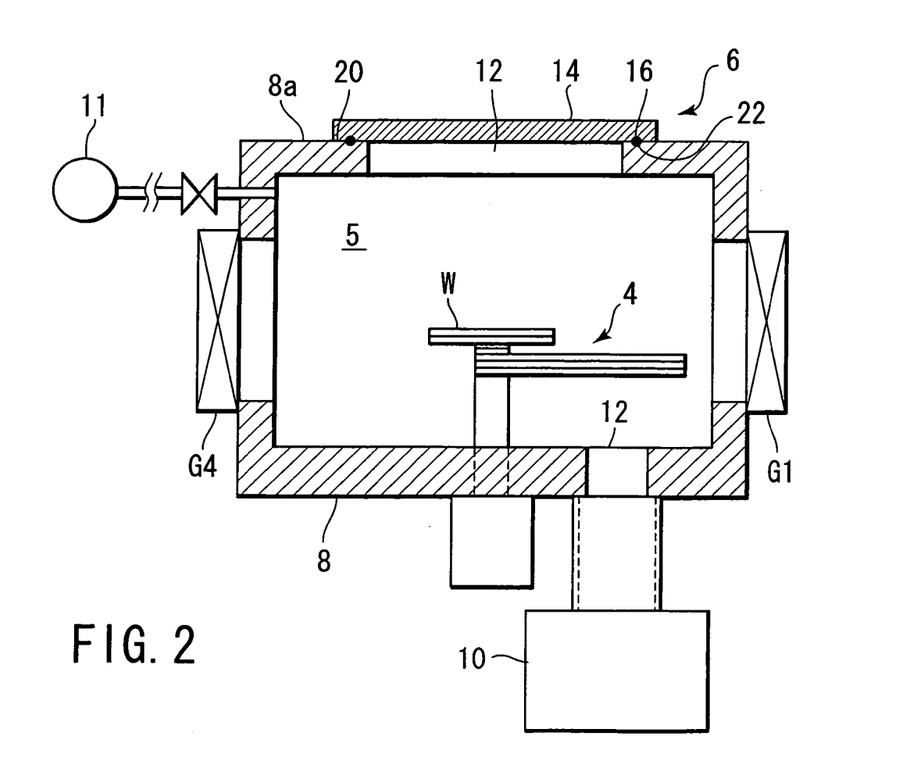
FIG. 2 is a sectional view showing a vacuum container apparatus that forms the transfer chamber of the vacuum processing system shown in FIG. 1.

Each of the process chambers 2a to 2d, transfer chamber 5, and load-lock chambers 3a and 3b is formed as a vacuum chamber, using a vacuum container apparatus, which can be vacuum-exhausted to a predetermined pressure. Each vacuum container apparatus includes a container main body having an opening formed in the top plate for maintenance or the like, and a lid for opening/closing the opening. As a representative of the vacuum container apparatuses, an explanation will be given of a vacuum container apparatus that forms the transfer chamber 5. FIG. 2 is a sectional view showing a vacuum container apparatus 6 that forms the transfer chamber 5.

As shown in FIG. 2, the vacuum container apparatus 6 includes an aluminum container main body 8 hollowed out to form the vacuum chamber (transfer chamber) 5. The container main body 8 is connected to a vacuum exhaust section (including, e.g., a vacuum pump) 10, which can vacuum-exhaust the interior of the container main body 8 to a level of, e.g., about $10^{-8}$ Pa. The container main body 8 is also connected to a gas supply section 11 for supplying nitrogen gas or another inactive gas.

The top plate 8a of the container main body 8 has an opening 12 formed therein for maintenance or the like. The opening 12 is opened and closed by an aluminum lid 14, which is moved by supporting mechanisms 18. A sealing member 16, such as an O-ring, is disposed between the lid 14 and container main body 8, for sealing the lip of the opening 12. A seat portion 20 is formed on the container main body 8 for the lid 14 to sit thereon. The seat portion 20 has a receiving groove 22 formed along the lip of the opening 12, so that the lower part of the sealing member 16 fits in the groove 22.

Figure 3:
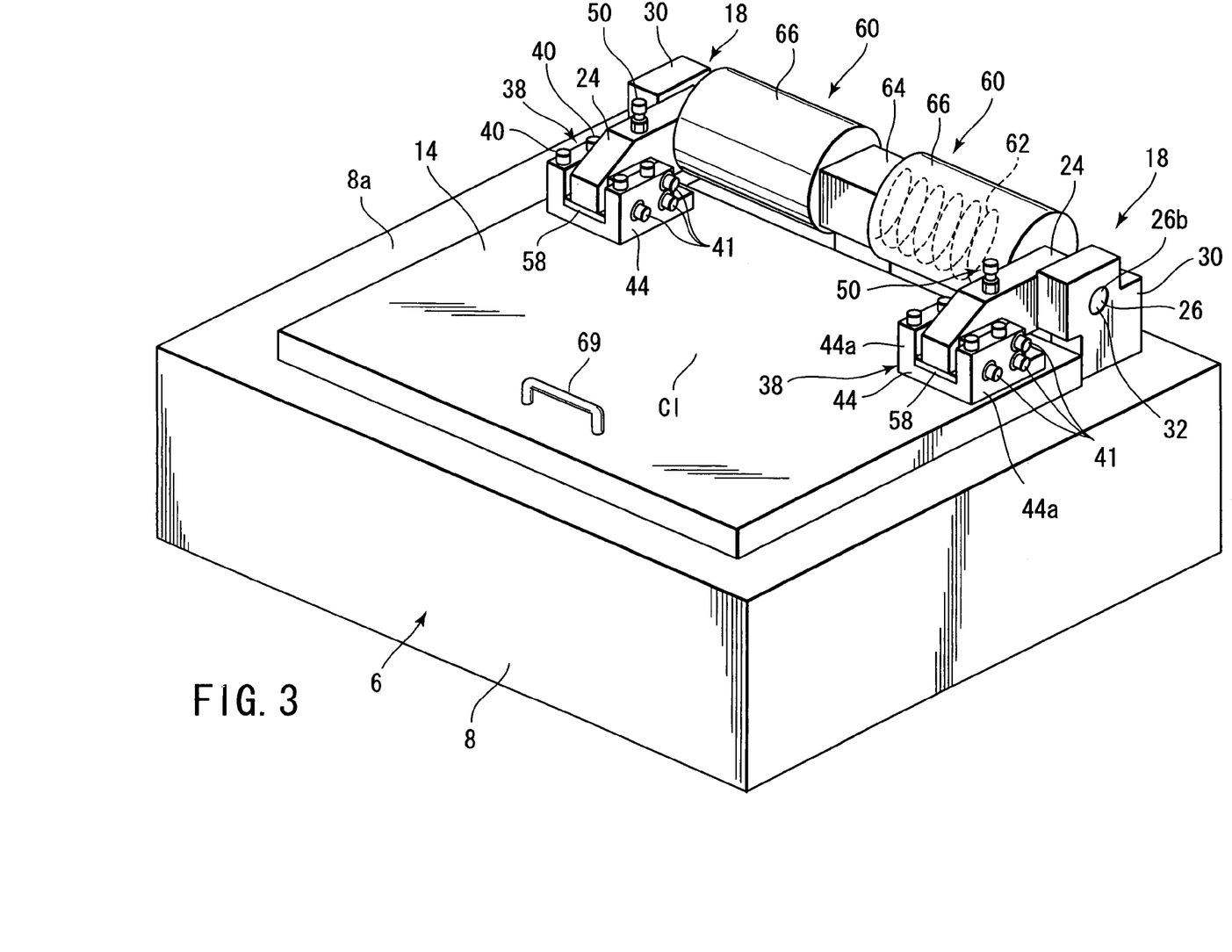
FIG. 3 is a perspective view of the vacuum container apparatus shown in FIG. 2, in a modified state for the sake of simplicity of the drawing.
Figure 4:
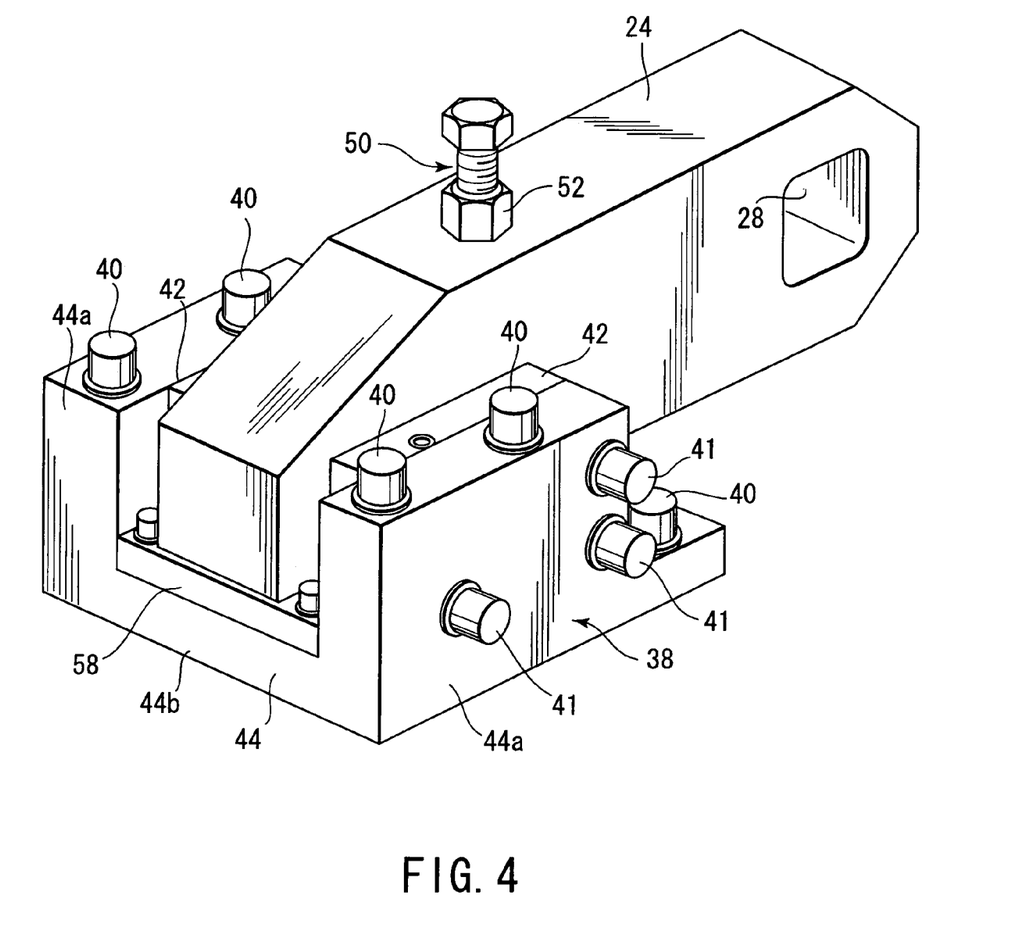
FIG. 4 is an enlarged perspective view showing a supporting mechanism employed in the vacuum container apparatus shown in FIG. 3.

The opening 12 formed in the top plate 8a of the container main body 8 has an arbitrary polygonal shape, such as a tetragon or hexagon. The lid 14 for closing the opening 12 has a polygonal shape analogous to that of the opening 12. In this embodiment, the transfer chamber 5, opening 12, and lid 14 have hexagon shapes in the plan view. FIG. 3 is a perspective view of the vacuum container apparatus 6, but it shows the vacuum container apparatus 6 in a modified state to have a rectangular shape in the plan view, for the sake of simplicity of the drawing. FIGS. 4 to 9 are views showing the supporting mechanisms 18 for the lid 14 in detail.

As shown in FIG. 3, a pair of supporting mechanisms 18 are disposed symmetrical with respect to the center C1 of gravity of the lid 14, on the top plate 8a of the container main body 8 around the opening 12. The supporting mechanisms 18 support the lid 14 to be operable for opening/closing, from the back face (top side) reverse to the working face (bottom side) of the lid 14. Each of the supporting mechanisms 18 includes a swing arm 24 for connecting the lid 14 to the container main body 8.

As described later in detail, the container main body 8 pivotally supports the swing arm 24 at a first axis 26, while the swing arm 24 swingably supports the lid 14 at a second axis 34. The second axis 34 is disposed between the center C1 of gravity of the lid 14 and the first axis 26. A regulatory member 50 is disposed at a regulatory position between the first and second axes 26 and 34 to intervene between the swing arm 24 and the back face (top side) of the lid 14. The regulatory member 50 regulates the distance between the swing arm 24 and the back face of the lid 14 at the regulatory position, so that the working face (bottom side) of the lid 14 is set in parallel with the opening 12, when the lid 14 is being closed.

More specifically, the proximal end of the swing arm 24 is rotatably supported by a bearing member 30 through a first shaft (first axis) 26. The distal end or free end of the swing arm 24 is provided with a second shaft (second axis) 34 attached thereto in parallel with the first shaft 26. The second shaft 34 swingably supports an attachment holder 38 for the lid 14. The first shaft 26 is connected to a bias mechanism 60 for assisting opening/closing operations of the lid 14.

The bearing member 30 is made of, e.g., stainless steel. The bearing member 30 is integrated with and fixedly mounted to the top side of the top plate 8a beside the opening 12 of the container main body 8. The bearing member 30 has a bearing hole 32 with an axis extending in parallel with one side of the opening 12. The swing arm 24 is also made of, e.g., stainless steel. The swing arm 24 has an essentially rectangular body with a rectangular cross section in the longitudinal direction. The proximal end of the swing arm 24 has an insertion hole 28 with a rectangular cross section, in which the first shaft 26 is fitted (see FIGS. 4 and 5).

A rectangular shaft portion 26a with a rectangular cross section (see FIG. 7) is formed at the inner end of the first shaft 26 (a side facing the corresponding swing arm 24) has, such that it corresponds to the insertion hole 28 of the swing arm 24. The rectangular shaft portion 26a is forcibly fitted in the insertion hole 28, so that the first shaft 26 is integrated with the swing arm 24 (they cannot rotate relative to each other). On the other hand, a round shaft portion 26b with a circular cross section (see FIG. 3) is formed at the outer end of the first shaft 26 (a side facing the corresponding bearing member 30). The round shaft portion 26b is rotatably inserted into the bearing hole 32 of the bearing member 30, to enable the swing arm 24 to swing.

The distal end of the swing arm 24 extends to one side of the lid 14 sitting on the seat portion 20 of the opening 12. The distal end of the swing arm 24 is provided with a bearing hole 36 (see FIG. 5) penetrating therethrough in parallel with the first shaft 26, for inserting the second shaft 34 therein. The second shaft 34 is inserted in the bearing hole 36, such that its opposite ends project from the sides of the swing arm 24. The second shaft 34 rotatably supports the attachment holder 38. The attachment holder 38 is integrated with and fixed to the back face (top side) of the lid 14 by bolts 40 near one side of the lid 14.

Figure 5:
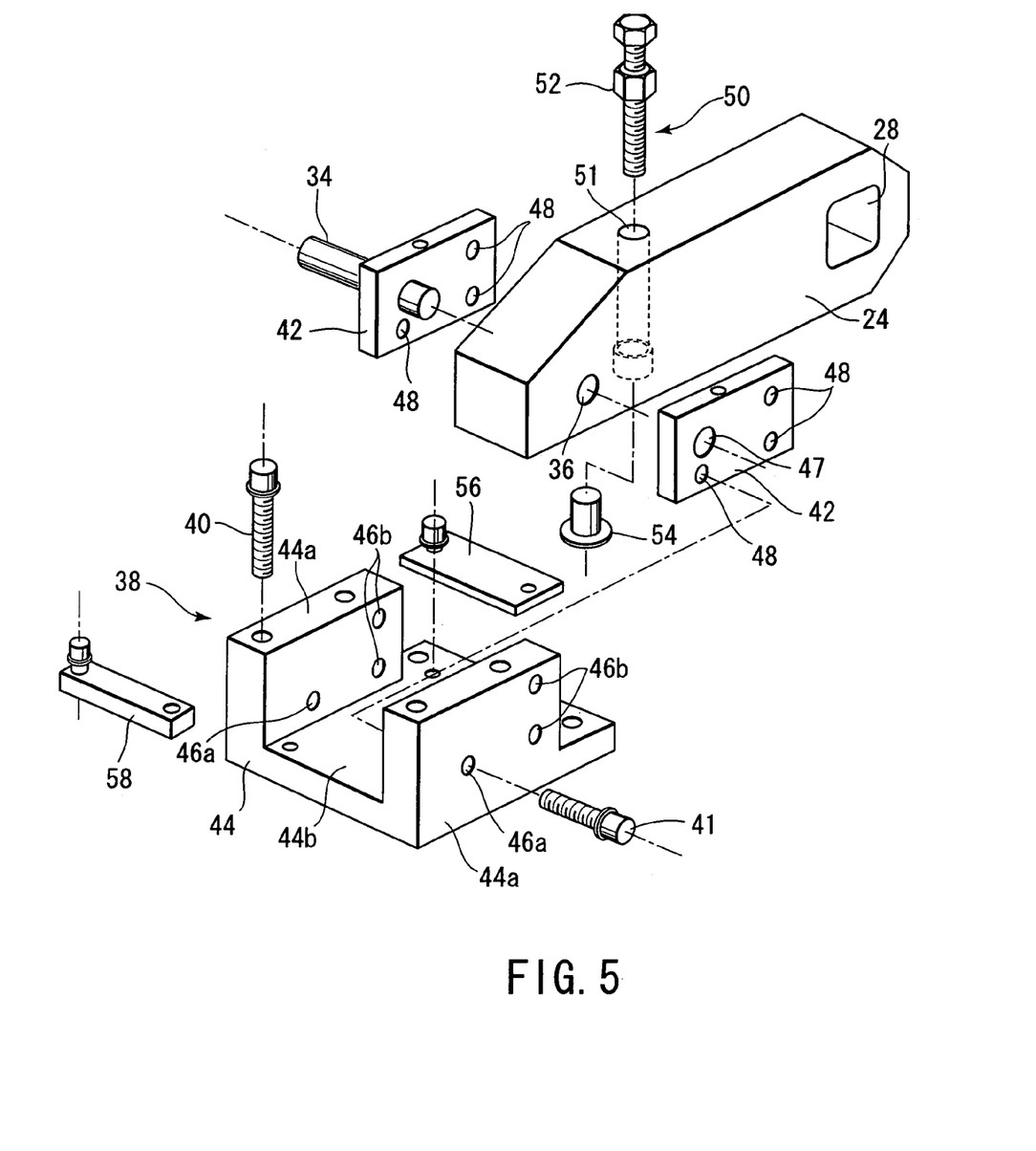
FIG. 5 is an exploded perspective view of the supporting mechanism shown in FIG. 4.

As shown in FIG. 5, the attachment holder 38 includes a pair of bearing plates (or side plates) 42, which are rotatably attached to the opposite ends of the second shaft 34 projecting from the sides of the swing arm 24. The bearing plates 42 are coupled to a U-shaped bracket 44, such that their positions are adjustable. Each of the bearing plates 42 has a bearing hole 47 for supporting an end of the second shaft 34, and a plurality of, e.g., three, screw holes 48 for respectively engaging with bolts 41.

The swing arm 24 is set at a position between the sidewalls 44a and 44a of the bracket 44 by the two bearing plates 42. Each of the bearing plates 42 is fixed to the inner surface of the corresponding sidewall 44a of the bracket 44 by a plurality of, e.g., three bolts 41. The bolts 41 are inserted into throughholes 46a and 46b formed in the sidewalls 44a of the bracket 44 from outside. The distal ends of the bolts 41 are respectively screwed into the screw holes 48 formed in the bearing plates 42. With this arrangement, the bearing plates 42 are coupled to the bracket 44.

One of the three bolts 41 is placed essentially directly below the bearing hole 47, and the other two are placed at upper and lower positions shifted toward the proximal end of the swing arm 24. The throughholes 46a and 46b are oblong holes longer in the vertical direction, so that the positions of the bolts 41 can be adjusted. Accordingly, the relative positions in height between the bracket 44 and bearing plate 42 can be slightly adjusted. As a consequence, for example, it is possible to set the swing arm 24 to be horizontal when the lid 14 horizontally comes in contact with the sealing member 16.

The swing arm 24 is provided with an adjustment screw 50, which functions as a regulatory member for regulating the distance between the swing arm 24 and the back face of the lid 14 at a position between the first and second shafts 26 and 34. The adjustment screw 50 allows a minimal distance to be set between the swing arm 24 and the back face of the lid 14, so that the lid 14 is prevented from inclining about the second shaft 34 by its own weight (rotation regulatory member). With this arrangement, the position of the lid 14 can be adjusted (the horizontal state of the lid 14 can be adjusted in this embodiment), so that the working face (bottom side) of the lid 14 is in parallel with the opening 12 and sealing member 16 when the lid 14 is closing the opening 12.

The adjustment screw 50 is screwed into a screw hole 51 formed in the swing arm 24, which penetrates the swing arm 24 from the top side to the bottom side, essentially perpendicularly. The portion of the adjustment screw 50 which projects from the top side of the swing arm 24 is provided with a lock nut 52 screwed thereon, to fix the adjustment screw 50 to the swing arm 24 after position adjustment. On the other hand, the bottom end of the adjustment screw 50 is provided with a ferrule 54 screwed thereon and projecting from the bottom side of the swing arm 24. The downward projecting length of the ferrule 54 from the bottom side of the swing arm 24 can be adjusted by rotating the adjustment screw 50 relative to the swing arm 24.

Figure 7:
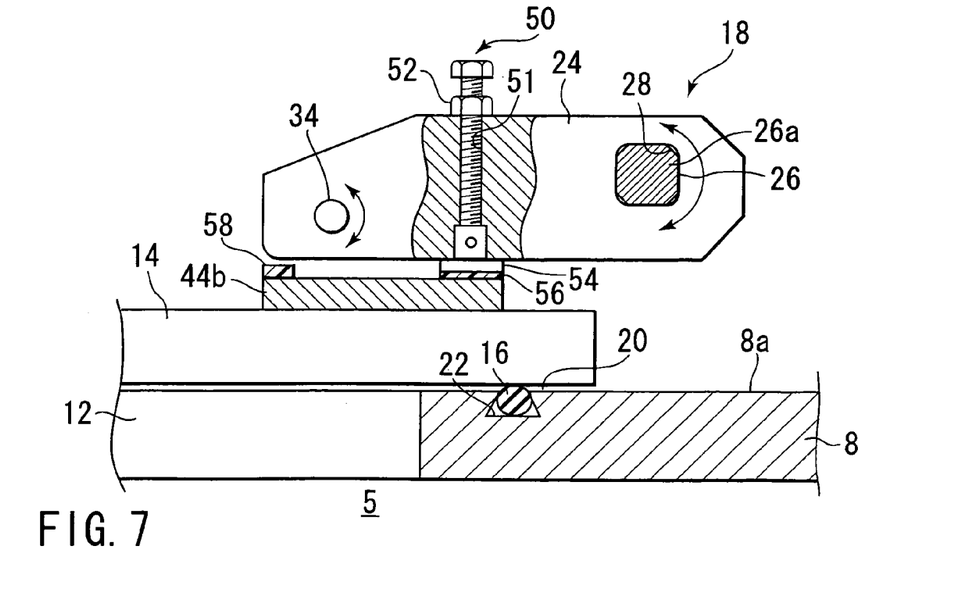
FIG. 7 is a sectional view taken along a line A-A in FIG. 6.

The adjustment screw 50 is disposed between the first and second shafts 26 and 34, and the ferrule 54 is opposed to the top side of the bottom plate 44b of the bracket 44. As shown in FIG. 7, a protection member 56 formed of, e.g., a hard synthetic resin plate is disposed to absorb the impact of collision, at a position (regulatory position) on the bottom plate 44b of the bracket 44, where the ferrule 54 comes into contact. A protection member 58 similarly to the protection member 56 is also disposed to absorb the impact of collision when the lid 14 is opened, at a position on the bottom plate 44b of the bracket 44, which corresponds to the distal end of the swing arm 24.

Figure 6:
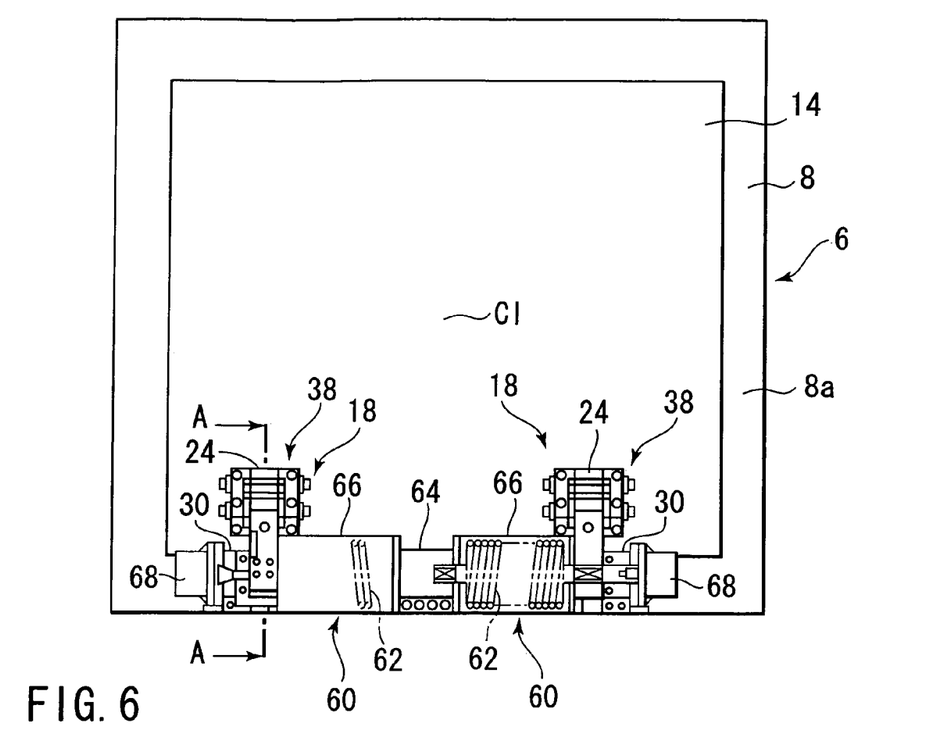
FIG. 6 is a plan view of the vacuum container apparatus shown in FIG. 3.

As shown in FIGS. 3 and 6, the two supporting mechanisms 18 are respectively connected to bias mechanisms 60, which supply the swing arms 24 with a bias force in a direction to open the lid 14. Each of the bias mechanisms 60 is disposed coaxially with the first shaft 26 and beside the bearing member 30, which pivotally supports the swing arm 24. More specifically, each bias mechanism 60 includes a coil spring 62, whose one end is fixed relative to the swing arm 24. The other end of the coil spring 62 is fixed relative to the container main body 8 by a connecting member 64. The coil spring 62 is covered with a cylindrical cover member 66.

The two coil springs 62 are disposed between the two swing arms 24 and coaxially with the first shafts 26. The connecting member 64 is fixed to the container main body 8 and stands in between the two coil springs 62. The inner ends of the two coil springs 62 are fixed to the connecting member 64. Each of the coil springs 62 is connected to the connecting member 64 and the swing arm 24 at the opposite ends, in a torsional state to give a bias force in a direction to open the lid 14. The lid 14 is biased by resilience of the torsional coil springs 62 in the opening direction. Accordingly, when the lid 14 is moved from the closing state to an opening state, the bias force of coil springs 62 is reduced.

The torsional moment of the coil springs 62 is set to approximate to the moment about the first shaft 26, generated by the weight of the lid 14 and swing arm 24 in a horizontal state. With this arrangement, the operating force necessary for opening/closing the lid 14 can be reduced, as far as possible. A damper 68 for slowing the opening/closing movement of the swing arm 24 is disposed on the outer side of each bearing member 30 (see FIG. 6). A handle 69 is attached to the back face of the lid 14 near the free end, so that an operator can manipulate the lid 14.

In this embodiment, the second shaft 34 rotatably connecting the lid 14 to the swing arm 24 is disposed between the center C1 of gravity of the lid 14 and the first shaft 26 rotatably connecting the swing arm 24 to the container main body 8. Furthermore, the adjustment screw 50, ferrule 54, and protection member 56 are disposed between the first shaft 26 and second shaft 34. The adjustment screw 50, ferrule 54, and protection member 56 (which are used as a regulatory member) prevent the lid 14 from inclining about the second shaft 34 by its own weight, so that the lid 14 can be set in parallel with the sealing member 16 when the lid 14 is being closed. The regulatory member can be adjusted in position by the adjustment screw 50 to absorb manufacturing errors. Accordingly, where a vacuum container apparatus only has very small manufacturing errors, the regulatory member may not require an adjustment screw for positional adjustment. The regulatory member may be disposed on either or both of the swing arm side and lid side.

As described above, the bias mechanisms 60 for supplying a bias force in a direction to open the lid 14 are connected to the supporting mechanisms 18, which support the lid 14 of the vacuum container apparatus 6 to be operable for opening/closing. Since the weight of the lid 14 and swing arms 24 is counterbalanced with the bias force of the bias mechanisms 60, the lid 14 is operable for opening/closing with a very small operating force. Due to the positional relationship between the center C1 of gravity of the lid 14, and the first and second shafts 26 and 34, the lid 14 is apt to rotate downward about the second shaft 34 by its own weight when the lid 14 is being operated for opening/closing. However, the adjustment screw 50 comes into contact, through the protection member 56, with the bottom plate 44b of the bracket 44 fixed to the lid 14, and prevents the rotation of the lid 14.

Figure 8:
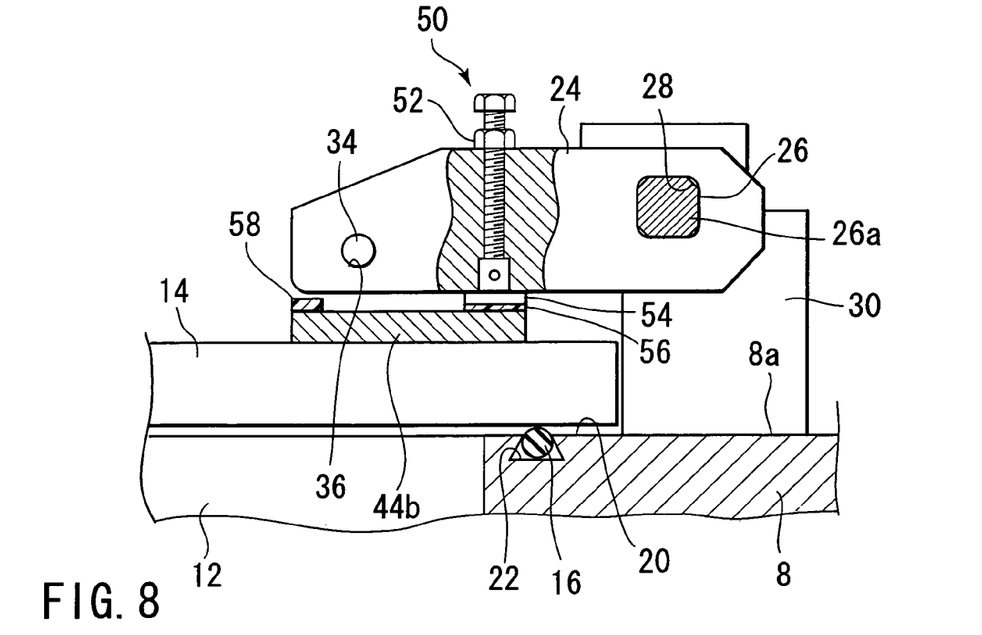
FIG. 8 is a sectional view showing a state where the lid is in contact with a sealing member disposed on a seat portion, in the same cross-section as FIG. 7.
Figure 9:
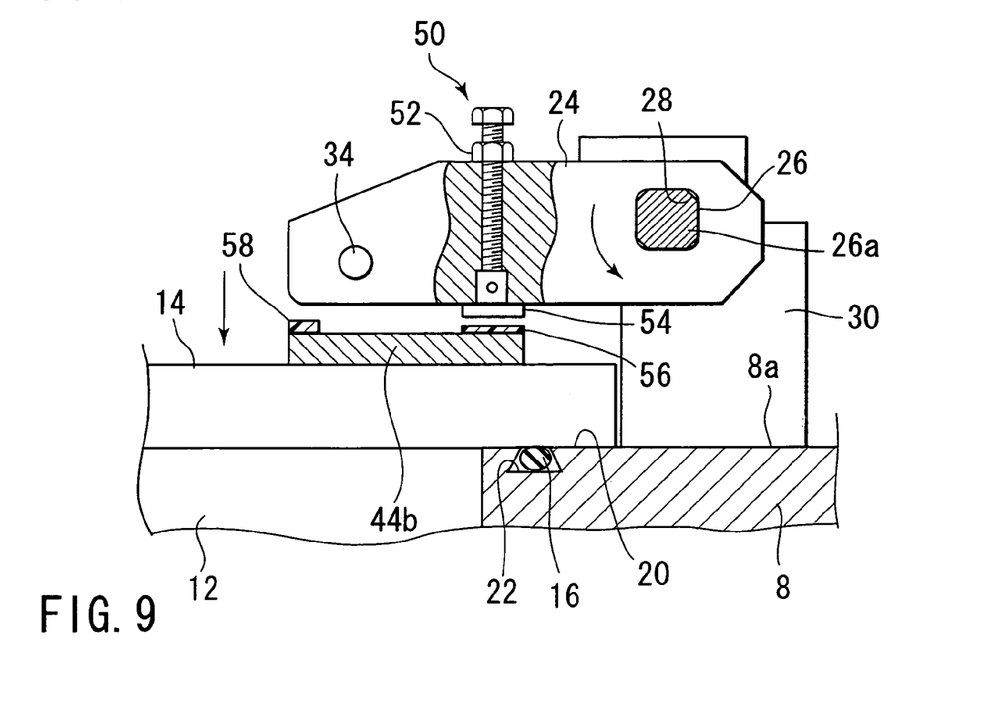
FIG. 9 is a sectional view showing a state where the lid is pressed against the seat portion by the vacuum pressure in the chamber, in the same cross-section as FIG. 7.

FIGS. 8 and 9 show movement of the lid, while it is being closed. As shown in FIG. 8, in this movement, the working face (bottom side) of the lid 14 first comes in contact with the sealing member 16 of the seat portion 20, to be in parallel with the sealing member 16. At this time, the weight of the lid 14 is counterbalanced with the bias force of the bias mechanisms 60, and thus the sealing member 16 is essentially not pressed. In other words, the lid 14 is still held in a state where it is in contact with the sealing member 16 with a slight gap from the seat portion 20. The position of the lid 14 in contact with the sealing member 16 is pre-adjusted by the adjustment screw 50, so that they are in parallel with each other. As a consequence, the lid 14 comes in contact with the sealing member 16 uniformly over the entire circumferential length thereof while it maintains a parallel state relative to the seat portion 20.

Then, the lid 14 is moved downward, while maintaining the parallel state, by a force generated as follows. Specifically, for example, the force may be generated by the pressure difference between the inside and outside of the vacuum chamber 5 obtained when the vacuum chamber 5 within the vacuum container apparatus 6 is vacuum-exhausted by the vacuum exhaust section 10. Alternatively, the force may be generated by a clamping force given by clamp devices (not shown) disposed around the lid 14 at positions between the lid 14 and container main body 8. As a consequence, as shown in FIG. 9, the lid 14 is moved downward while maintaining the parallel state, and sits on the seat portion 20 of the container main body 8 and presses the sealing member 16. At this time, the lid 14 is shifted downward by a length corresponding to a pressed amount of the sealing member 16, and thus the swing arms 24 are drawn downward through the attachment holder 38 by this downward shift and are slightly rotated.

In this final rotation, the downward shift of the distal end of the adjustment screw 50 is smaller than the downward shift of the second shaft 34. In other words, at this time, the downward shift of the adjustment screw 50 is smaller than the downward shift of lid 14. This is so, because the adjustment screw 50 is disposed between the second shaft 34 and first shaft 26.

With this arrangement, when the lid 14 is shifted downward from the horizontal state on the sealing member 16, the distal end of the adjustment screw 50 (ferrule 54) separates from the protection member 56 attached on the bracket 44. The ferrule 54 thus does not interfere with the lid 14, when the lid 14 is shifted downward while maintaining the parallel state, and sits on the seat portion 20. As a consequence, the lid 14 can airtightly close the opening 12 of the vacuum container apparatus 6. Since the lid 14 does not incline when it is being moved downward and closed, the lid 14 cannot abrade the sealing member 16. Furthermore, the lid 14 does not cause friction in metal touch with the seat portion 20 of the container main body 8, and particles are thereby suppressed or prevented from being generated.

According to the embodiment described above, the lid can sit in a parallel state on the seat portion 20 and sealing member 16 around the opening 12 of the container main body 8. The length of the swing arms 24 is small, and thus the entire apparatus can be compact. The adjustment screw 50 is employed as a regulatory member for regulating the distance between each swing arm 24 and the back face of the lid 14, and thus the horizontal state of the lid 14 in the closed state can be easily adjusted. The protection member 56 is attached on each bracket 44 of the lid 14 at a position corresponding to the tip of the adjustment screw 50. This allows the durability of the apparatus to be improved, and particles, such as metal dust, to be prevented from being generated in collision. Each bracket 44 fixed to the lid 14 and the bearing plates 42 attached to each swing arm 24 can be adjusted in relative position. This allows the height of the lid 14 held in a parallel state (the distance between the lid 14 and the seat portion 20 of the container main body 8) to be easily adjusted. The bias mechanisms 60 are connected to the swing arms 24 to give a bias force in a direction to open the lid 14, and thus the lid 14 is operable for opening/closing with a smaller energy and good operability.

An embodiment of the present invention has been described with reference to the accompanying drawings, though the present invention is not limited to this embodiment. Various modifications and changes within the spirit of the present invention may be anticipated. For example, the embodiment described above is exemplified by the structure of a lid 14 for opening/closing an opening 12 of a vacuum container for maintenance or the like. The present invention may be similarly applied to a lid of anther type.

INDUSTRIAL APPLICABILITY

According to the present invention, it is possible to provide a lid apparatus and vacuum container apparatus that can be compact.

The invention claimed is:

1. A lid apparatus for opening/closing an opening formed in a main body, the apparatus comprising:
    a lid having a working face configured to open/close the opening, and a back face reverse to the working face;
    an arm attaching the lid to the main body, for the lid to be operable for opening/closing, the arm including a first axis to pivotally support the arm relative to the main body around the opening, and a second axis to swingably support the lid relative to the arm through the back face, and the second axis being disposed between a center of gravity of the lid and the first axis;
    a regulatory member configured to intervene between the arm and the back face of the lid, at a regulatory position between the first and second axes, so as to regulate a distance between the arm and the back face of the lid at the regulatory position, such that the working face of the lid is set in parallel with the opening;
    a bracket fixed to the back face of the lid; and
    a bearing plate supported by the arm pivotally about the second axis,
    wherein the bracket and the bearing plate are fixed to each other by a plurality of connecting portions, each of the connecting portions including a throughhole formed in the bracket and elongated in a vertical direction, a screw hole formed in the bearing plate, and a rod-shaped fastener extending through the throughhole and fastening the bracket and the bearing plate to each other, such that the rod-shaped fastener is adjustable in position within the throughhole to allow the bracket and the bearing plate to be adjusted in relative positions in the vertical direction, and wherein the rod-shaped fastener is a bolt extending through the throughhole and screwed into the screw hole such that the bracket is fixed by the bolt between the bolt and the bearing plate.

2. A vacuum container apparatus, comprising:

an airtight container main body having an opening and a seat portion surrounding the opening;

a vacuum exhaust section configured to exhaust an interior of the main body;

a sealing member disposed on the seat portion around the opening;

a lid configured to sit on the seat portion and airtightly close the main body through the sealing member, the lid having a working face configured to open/close the opening, and a back face reverse to the working face;

an arm attaching the lid to the main body, for the lid to be operable for opening/closing, the arm including a first axis to pivotally support the arm relative to the main body around the opening, and a second axis to swingably support the lid relative to the arm through the back face, and the second axis being disposed between a center of gravity of the lid and the first axis;

a regulatory member configured to intervene between the arm and the back face of the lid, at a regulatory position between the first and second axes, so as to regulate a distance between the arm and the back face of the lid at the regulatory position, such that the working face of the lid is set in parallel with the opening;

a bracket fixed to the back face of the lid; and a bearing plate supported by the arm pivotally about the second axis, wherein the bracket and the bearing plate are fixed to each other by a plurality of connecting portions, each of the connecting portions including a throughhole formed in the bracket and elongated in a vertical direction, a screw hole formed in the bearing plate, and a rod-shaped fastener extending through the throughhole and fastening the bracket and the bearing plate to each other, such that the rod-shaped fastener is adjustable in position within the throughhole to allow the bracket and the bearing plate to be adjusted in relative positions in the vertical direction, and wherein the rod-shaped fastener is a bolt extending through the throughhole and screwed into the screw hole such that the bracket is fixed by the bolt between the bolt and the bearing plate.

3. The apparatus according to claim 1, wherein the opening is horizontally disposed and faces upward, and the regulatory member is configured to allow a minimal distance to be set between the arm and the back face of the lid at the regulatory position, so as to prevent the lid from inclining about the second axis by its own weight.

4. The apparatus according to claim 3, wherein the regulatory member comprises an adjustment screw attached to the arm and configured to be adjustable in projecting a length from the arm.

5. The apparatus according to claim 3, further comprising a protection member disposed between the regulatory member and the back face of the lid, and configured to absorb a contact impact.

6. The apparatus according to claim 1, further comprising a bias mechanism configured to supply the arm with a bias force in a direction to open the lid.

7. The apparatus according to claim 2, wherein the opening is horizontally disposed and faces upward, and the regulatory member is configured to allow a minimal distance to be set between the arm and the back face of the lid at the regulatory position, so as to prevent the lid from inclining about the second axis by its own weight.

8. The apparatus according to claim 7, wherein the regulatory member comprises an adjustment screw attached to the arm and configured to be adjustable in projecting a length from the arm.

9. The apparatus according to claim 7, further comprising a protection member disposed between the regulatory member and the back face of the lid, and configured to absorb a contact impact.

10. The apparatus according to claim 2, further comprising a bias mechanism configured to supply the arm with a bias force in a direction to open the lid.

* * * * *